US006781049B2

(12) United States Patent
Taylor

(10) Patent No.: US 6,781,049 B2
(45) Date of Patent: Aug. 24, 2004

(54) STRINGED MUSICAL INSTRUMENT NECK MOUNTED LIGHT EMITTING OPTICAL DISPLAY ARRAY

(76) Inventor: Charles R. Taylor, 14595 E. Oregon Dr., Aurora, CO (US) 80012

( * ) Notice: Subject to any disclaimer, the term of this patent is extended or adjusted under 35 U.S.C. 154(b) by 80 days.

(21) Appl. No.: 10/281,359

(22) Filed: Oct. 28, 2002

(65) Prior Publication Data

US 2004/0079219 A1 Apr. 29, 2004

(51) Int. Cl.[7] ................................................ G09B 15/02
(52) U.S. Cl. ................. 84/477 R; 84/485 R; 84/464 A; 84/293
(58) Field of Search ........................... 84/477 R, 485 R, 84/464 A, 293

(56) References Cited

U.S. PATENT DOCUMENTS 4,080,867 A * 3/1978 Ratanangsu ............... 84/477 R
5,373,768 A * 12/1994 Sciortino ..................... 84/293
5,396,827 A * 3/1995 Miller et al. .................. 84/454
5,637,820 A * 6/1997 Wittman ....................... 84/454
6,225,544 B1 * 5/2001 Sciortino .................. 84/464 A
6,452,081 B1 * 9/2002 Ravagni et al. ........... 84/477 R

* cited by examiner

*Primary Examiner*—Shih-Yung Hsieh

(57) ABSTRACT

An attachable and removable Light Emitting Diode array adhesively adhered to the top edge surface of a stringed instrument fretboard and fretboard. The device uses independently wired electronically driven (LED's) positioned at or near each standard embedded fret location marker and functions as an optical data display system when wired to an electronic audio signal processing device power source that may be mounted inconspicuously on the neck or body of an instrument. Located in such close proximity to the musician's eyes, the intensity of the display array's bright emissions of light allows for high visibility of the reference data under all light conditions. The array's extremely small size and unobtrusive shape does not obstruct the movement of the fretting hand, and the device does not modify, damage, or de-value the original condition of the instrument.

3 Claims, 3 Drawing Sheets

STRINGED MUSICAL INSTRUMENT NECK MOUNTED LIGHT EMITTING OPTICAL DISPLAY ARRAY

FIELD OF INVENTION

This invention relates particularly to a stringed musical instrument electronic optical display array that is adhesively attached to the top side complete length of the instrument's neck. Its function is to optically display the output of electronic signal processing, calibration, and note location devices separately attached to or within the stringed instrument's body. The invention and the signal generating device are connected by an electrical wire harness. The invention is attachable and removable and does not modify or damage the original condition of the stringed instrument or interfere with the movement of the musician's fretting hand.

DESCRIPTION OF PRIOR ART

| References cited: | | | |
|---|---|---|---|
| 5,637,820 | June 1997 | Wittman | 84/454 |
| 5,373,768 | December 1994 | Scoirtino | 84/293 |
| 5,396,827 | March 1995 | Miller | 84/454 |

Paragraph 1. Stringed instrument players share the problems of trying to correctly observe the small indicator screens and display systems of portable audio signal processing/analyzing devices such as tuners that are typically hidden on the floor in an inconspicuous location relative to the audience's visual point of view during a performance. The small displays are designed be easily integrated into the small body of the processing devices to facilitate easy concealment, portability, and storage.

Paragraph 2. The consequence of this design trait is a high degree of difficulty in observing the visual information presented due to the limited optical output of the small monitoring displays. Stringed instrument players also share the similar difficulty of trying to visibly locate specific fret positions on the neck by trying to observe the small fret markers either imbedded into, or painted onto the top side of the instrument neck, during low light conditions. Due to the fretting hand movement on the neck of the instrument, visually assistive devices mounted directly on the neck typically cause an undesirable obstruction of hand movement. One previous method used to address these problems have been to imbed a small electronic optical display into the material of the instrument, which requires a permanent and expensive modification of the instrument structure, thus lowering the value and desirability of the instrument. See (U.S. Pat. No. 5,637,820). Other previous methods to address the low visibility of fret position displays have been to either once again permanently and expensively modify or construct the instrument with light emitting devices within the neck structure such as (U.S. Pat. No. 3,943,81) or attach a piece of fiber optic wire strand to the surface of the neck and illuminate it with a single light source (U.S. Pat. No. 5,373,768), which does not offer enough visible light output be useful in any situation other than almost complete darkness, and cannot operate as multiple independent light sources to serve as a display for various audio signal processing devices.

Paragraph 3. What is needed is a high output electronic optical display device that is attachable and removable requiring no modification of the original instrument, and that will provide a highly visible display of the reference data under all lighting conditions, It must be capable of displaying all of it's reference information clearly and in a manner that is aesthetically pleasing to both the musician and the audience. The device must meet the challenge of also allowing unobstructed playing of the instrument.

Paragraph 4. While the prior art provides methods to reduce the poor visibility of stringed instrument mounted electronic signal displays without obstructing the playability of the instrument, no prior art is known that provides the suggestion of a complete solution without permanent modification of the instrument's structure.

BRIEF SUMMARY OF THE INVENTION

The invention is a stringed instrument neck mounted electrical optical display array that addresses the aforementioned low display visibility problems through the use of a unique array of light emitting diodes. The array is constructed of an extremely thin contoured transparent and rigid body that encloses circuit boards, electrical wiring, and multiple light emitting diodes. With the invention adhered to the top surface of stringed instrument neck by means of double sided adhesive tape placed underneath the bottom surface of the array and it's wiring harness is connected to the separately mounted signal processing device's output terminals, the invention provides a highly illuminated optical display of the generated reference data. The invention's miniature height/width dimensions and unique shape allow it to be adhered directly to the top surface along the entire length of an instrument fretboard and not interfere with the fretting hand of the musician, while requiring no permanent modification of the instrument's original condition.

DESCRIPTION OF THE PREFERRED EMBODIMENT

Figure 1:
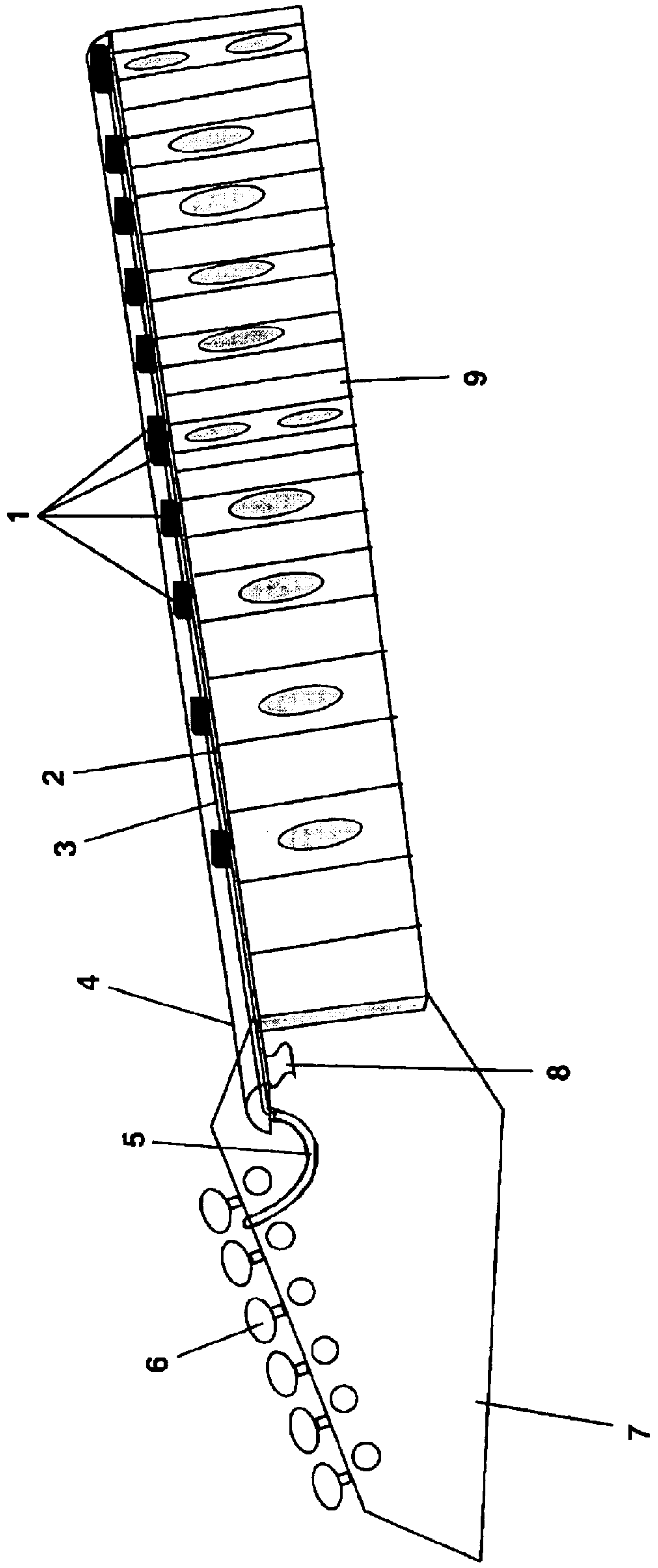
FIG. 1 Is a perspective view of the electrical display array adhered to and extended along the top side length of a stringed instrument fretboard.

Referring to FIG. 1

A plurality of LEDs 1 are aligned in a row and spaced at intervals according to the desired function of the electrical display array 4 such as pitch calibration display, fret markers, rhythm display, or sequential oscillator. The anodes and cathodes of the LEDs 1 are electrically connected to the wiring harness 5 by bare tinned solid wire 2 or by flat conductive material 3. The electrical connection material 2 or 3 extends out past the headstock 7 end of the electrical display array 4 and is enclosed in flexible tubing forming the wiring harness 5. The wiring harness 5 is routed from the electrical display array 4 to the headstock 7 along the front side length then over the top side width of the headstock 7 between two tuning keys 6 then downwards along the rear side height of the headstock 7. The electrical display array

4 is secured to the top side length of the instrument fretboard 9 by means of double-sided adhesive tape 8 mounted along the bottom side length of the electrical display array 4.

DESCRIPTION OF THE PREFERRED EMBODIMENT

Figure 2:
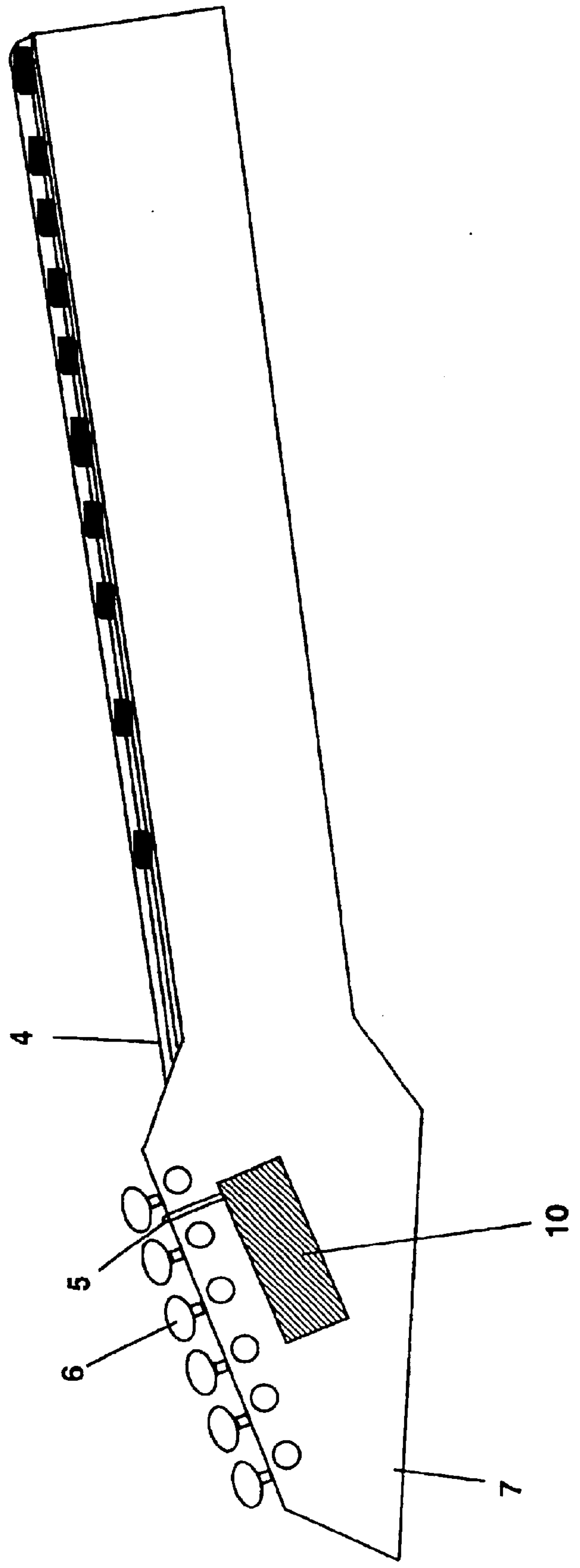
FIG. 2 Is a rear perspective view of the electrical display array adhered to and extended along the top side length of a stringed instrument fretboard, and the mounting location of the battery powered signal generator mounted on the rear side of the headstock.

Referring to FIG. 2

The electrical display array 4 wiring harness 5 is routed from the electrical display array 4 along the front side length of the headstock 7 then over the top side width of the headstock 7 between two tuning keys 6 then downwards along the rear side height of the headstock 7 connecting directly to the battery powered signal generator 10 mounted on the rear side of the headstock 7.

DESCRIPTION OF THE PREFERRED EMBODIMENT

Figure 3:
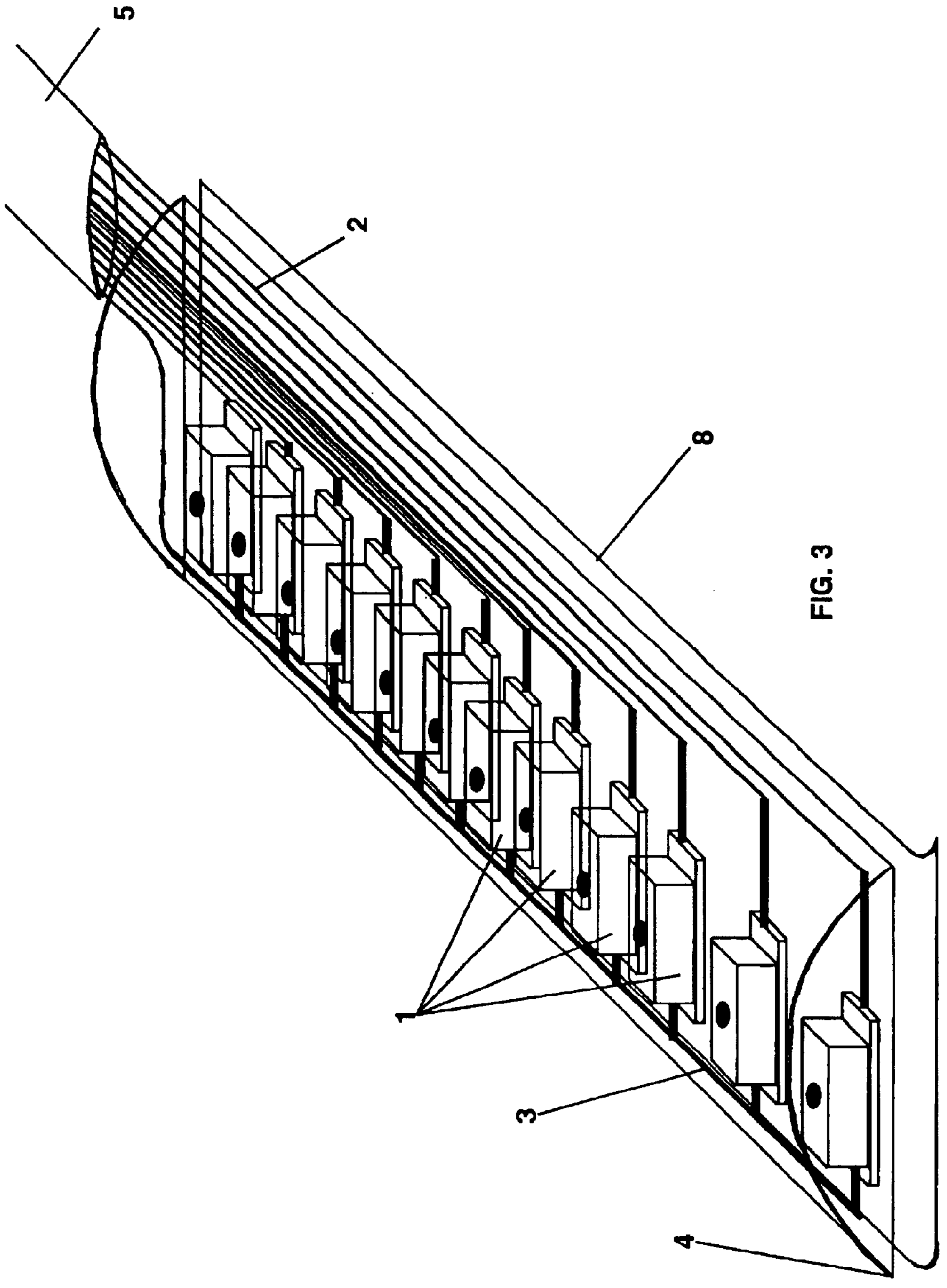
FIG. 3 Is an exploded transparent view of the rigid transparent structure encapsulating the LED's and electrical connectors to form the unique unobtrusive shape of the electrical display array.

Referring to FIG. 3

An exploded transparent view of the internal workings of the electrical display array 4, the associated wiring harness 5, and the double-sided adhesive mounting tape 8 is depicted. The electrical display array 4 consists of a plurality of surface-mount LEDs 1 electronically connected by wire 2 or flat conductive material 3 fully encapsulated inside a rigid transparent structure having a low radius domed top and a flat underside surface. The LED connected ends of the electrical connectors 2 or 3 are encapsulated within the structure of the electrical display array while the battery powered signal generator 10 (as shown in FIG. 2) connected ends extend outside of the structure and into a sheath of flexible tubing forming the wiring harness 5. Double-sided adhesive tape 8 is used to secure the flat bottom side length of the display array 4 to the top side length of the instrument fretboard 9 (as shown in FIG. 1).

What I claim as my invention is:

1. An attachable and removable electrical optical display array adhered to and extending along the full top side length of a stringed musical instrument neck without modification or damage to the original condition of the instrument, comprising a single array of independently illuminated light emitting diodes and diode clusters fully encapsulated inside a rigid transparent structure that is electrically wired to a separately adhered or embedded electronic audio signal processing device, providing a highly visible display of the processed signal reference data under all lighting or no light conditions without obstructing the fretting hand on the instrument.

2. An attachable and removable electrical optical display array adhered to and extending along the full top side length of a stringed musical instrument neck without modification or damage to the original condition of the instrument, comprising a single array of light emitting diodes fully encapsulated inside a rigid transparent structure that is electronically connected to a battery driven power supply that is separately adhered to the instrument neck or body, providing highly visible illuminated fret location markers under all light conditions without obstructing the fretting hand on the instrument.

3. An attachable and removable electrical optical display array adhered to and extending along the full top side length of a stringed musical instrument neck without modification or damage to the original condition of the instrument, comprising a single array of independently illuminated light emitting diodes fully encapsulated inside a rigid transparent structure that is electronically wired to a programmable LED pattern sequencing integrated circuit, to display visually entertaining oscillating light patterns.

* * * * *